Patented Feb. 29, 1944

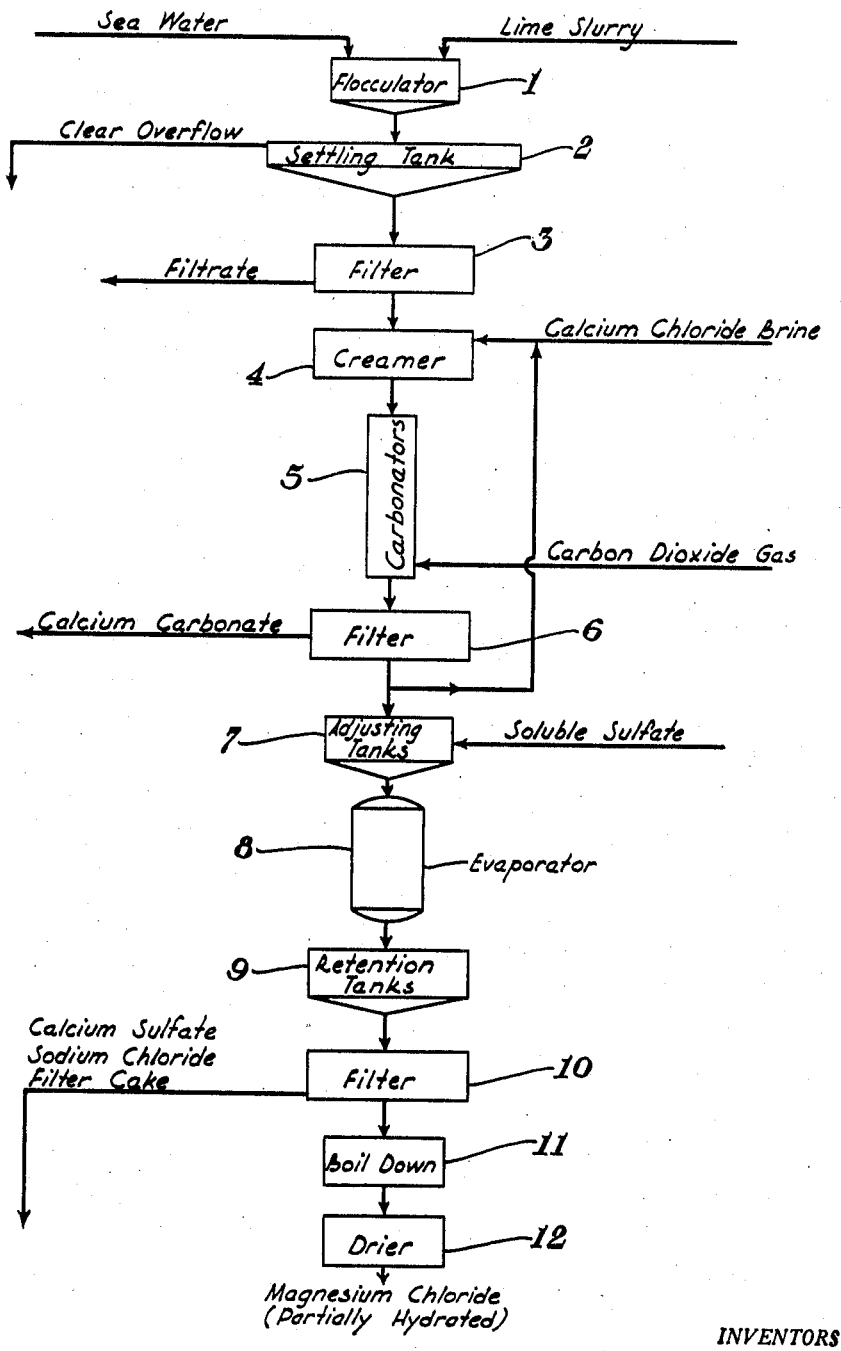

2,342,666

UNITED STATES PATENT OFFICE 2,342,666

RECOVERING MAGNESIUM SALTS

Sheldon B. Heath and Forest R. Minger, Midland, Mich., assignors to The Dow Chemical Company, Midland, Mich., a corporation of Michigan Application August 5, 1942, Serial No. 453,642

3 Claims. (Cl. 23—91)

This invention relates to a method of recovering the magnesium content from sea water.

The principal object of the invetnion is to provide an improved method of treating sea water and like brines to separate the magnesium content thereof and recover the same in the form of partially hydrated magnesium chloride substantially free of the other constituents normally present in such brines.

The process of the invention is based on a series of steps involving mixing the sea water or other magnesium-containing brine with alkali, thereby converting the magnesium salts to a precipitate of magnesium hydroxide, separating the latter from the spent brine, treating the separated magnesium hydroxide with calcium chloride and carbon dioxide, forming magnesium chloride solution and precipitating calcium carbonate which is removed, treating the magnesium chloride solution so formed to remove any remaining impurities, and evaporating the solution to dryness, forming substantially pure magnesium chloride. The manner in which each of these steps is to be carried out in order to obtain a final product of high purity is hereinafter explained in detail.

The invention may best be explained with reference to the acompanying drawing, which illustrates diagrammatically the flow of materials in a preferred embodiment of the new process.

The raw sea water, or sea water from which bromides have been removed by prior treatment, contains, in addition to the desired magnesium chloride, substantial proportions of dissolved calcium salts and of sodium chloride. In the case of sea water, at least, small but significant proportions of other substances such as sulfates and borates are also present. All these materials must, of course, be separated from the magnesium chloride.

In the process as shown in the drawing, the raw sea water is run continuously into a flocculator 1 in which it is mixed with an aqueous solution or suspension of an alkali, conveniently milk of lime prepared by slaking quicklime in water, classifying to remove sediment, and thickening the resulting mixture to a concentration of 12 to 20 pounds of lime per cubic foot. The alkali converts the dissolved magnesium salts in the sea water to insoluble magnesium hydroxide, the latter forming as a flocculent precipitate which is separated from the sea water and converted to magnesium chloride in the subsequent stages of the process.

While, in the invention in its broadest sense, the precipitation step may be carried out by adding lime or other alkali to the raw brine in any proportion sufficient to convert at least a major part of the dissolved magnesium salts to magnesium hydroxide, in the case of sea water, which contains appreciable quantities of dissolved boron compounds, careful control of the proportion of alkali employed is necessary to minimize the quantity of boron retained as impurity in the settled magnesium hydroxide precipitate. Thus it has been found that when there is used an amount of lime or other alkali less than that sufficient to react with all the magnesium salts in the sea water, the magnesium hydroxide which is precipitated carries with it, probably by adsorption, a large proportion of the boron compounds in the raw water. These compounds persist through the subsequent steps of the process, and appear as impurities in the final magnesium chloride. However, if, in the initial precipitation of magnesium hydroxide from the raw sea water, an excess of alkali is added, the boron compounds are not appreciably retained by the magnesium hydroxide precipitate, but remain in solution, and hence never appear to any substantial degree in the final magnesium chloride product. Minimum retention of boron results when the lime or other alkali is added in such excess as to produce in the treated sea water an alkalinity corresponding to a normality above 0.01 N, preferably about 0.015 N to 0.045 N; with lime, this latter value corresponds roughly to a 10 to 45 per cent overliming of the sea water.

Following the precipitation step in the flocculator 1, the magnesium-hydroxide-containing treated sea water is transferred to a settling tank 2, such as a Dorr thickener, in which it is maintained in a quiescent state, so that the magnesium hydroxide settles to the bottom of the tank as a thick sludge, the latter being usually withdrawn when it contains from 2 to 6 per cent by weight of anhydrous magnesium hydroxide. The bulk of the original sea water remains as a supernatant clarified liquor, and is ordinarily allowed to overflow to waste.

The thickened magnesium hydroxide sludge withdrawn from the settling tank 2 is pumped to a filter 3, conveniently a suction filter of the Moore type, in which the magnesium hydroxide is recovered as a solid cake, the filtrate being discarded or returned to the flocculator for reworking. The wet filter cake usually contains 10 to 20 per cent by weight of anhydrous magnesium hydroxide, together with 0.5 to 5.0 per cent of calcium salts, sodium chloride, sulfates, and other impurities, and in this form is forwarded for treatment with calcium chloride solution and carbon dioxide to produce the desired magnesium chloride, according to the reaction $$Mg(OH)_2 + CaCl_2 + CO_2 = MgCl_2 + CaCO_3 + H_2O$$

In order to effect this reaction, the magnesium hydroxide filter cake is first dispersed in calcium chloride solution, after which the carbon dioxide is introduced into the dispersion. To this end, the filter cake is loaded into a creamer 4, ordinarily a large tank provided with powerful agitators, and is there mixed thoroughly with calcium chloride brine or with a mixture of calcium chloride brine with magnesium chloride brine derived from a later stage in the process, to form a smooth milklike slurry, which should preferably contain about 1 to 8 per cent by weight of suspended hydroxide to permit easy circulation in the process. A particularly convenient creaming procedure is first to mix the solid magnesium hydroxide filter cake with a small volume of a slurry of magnesium hydroxide remaining from a previous creaming, and then to dilute the resulting dispersion, in one or more stages of agitation, with the calcium chloride brine.

The calcium chloride brine is preferably mixed with the magnesium hydroxide filter cake in such proportion that calcium chloride is present in a quantity equivalent to or in slight excess of the magnesium hydroxide, to insure complete reaction of the latter. The calcium chloride solution may be derived from any desired source, and may conveniently be the residual calcium-chloride-containing liquor from an ammonia-soda plant or the spent liquor derived from any of a number of organic chemical processes involving the lime hydrolysis of chlorinated hydrocarbons.

After the creaming of the magnesium hydroxide with calcium chloride brine, the creamed slurry is pumped to one of a series of carbonators 5, in which carbon dioxide gas is brought into contact with the agitated slurry for a time sufficient to effect substantially complete conversion of the magnesium hydroxide to magnesium chloride. In general, the carbon dioxide gas, which is usually obtained from combustion gases or from the calcining of limestone or dolomite, should contain 12 to 35 per cent of carbon dioxide or more, the remainder being air or other combustion gases.

After carbonation, the resulting magnesium chloride-calcium carbonate aqueous mixture is pumped through a filter 6, or alternatively a settling tank, in which the calcium carbonate is removed together with any silt, etc., which may have been in the original sea water, and is discarded. A part of the clarified brine may, if desired, be returned to the creamer 4 to assist in the creaming operation. The remainder of the brine, which consists essentially of an aqueous solution of magnesium chloride, but also contains any excess calcium chloride remaining from the carbonation step and may also include sodium chloride, sulfates, etc., present in the magnesium hydroxide filter cake, is forwarded for purification and recovery of magnesium chloride. The sodium chloride impurity may be precipitated and withdrawn as such on subsequent evaporation of the brine, but a chemical treatment is necessary in order to remove the calcium salts and sulfates, if any, preferably by converting them to insoluble calcium sulfate. In the preferred removal method shown in the drawing, the clarified brine is run into one of a number of adjusting tanks 7, and the tank contents analyzed to find the concentration of dissolved calcium salts and of sulfates, if any. When the analysis has been made, assuming the calcium to be present in excess relative to the sulfate, as is almost invariably the case, a strong solution of a soluble sulfate, e. g., sodium or magnesium sulfate, is then added with agitation to the tank in a proportion calculated to be that at which the resulting solution will contain sulfate in a proportion substantially equivalent stoichiometrically to the calcium content thereof, i. e., so that all the calcium and sulfate in the brine will be present as the compound calcium sulfate. Following this adjustment, the contents of the tank is again analyzed to determine whether the calcium and sulfate are actually in the intended ratio, and, if necessary, further small additions of calcium chloride or soluble sulfate reagent are made until substantial equivalency of calcium and sulfate is reached. Exact equivalency is not necessary, it sometimes being desirable to permit a very slight excess of calcium or of sulfate to remain, e. g., up to 0.05 per cent, to insure substantially complete removal of sulfate or of calcium, as may be desired.

After the calcium sulfate adjustment has been made, the adjusted brine is allowed to settle or is filtered to remove any suspended calcium sulfate which may have accumulated, and is then pumped to an evaporator 8 in which it is concentrated by removal of water until there is formed a solution sufficiently concentrated that the calcium sulfate and sodium chloride are substantially insoluble therein. This evaporated brine, which usually contains 30 to 40 per cent by weight of magnesium chloride, most suitably 34 to 35 per cent, is then cooled if necessary and transferred to a retention tank 9 in which it is agitated for a period sufficient for the insoluble but supersaturated calcium sulfate and sodium chloride to precipitate out of solution, usually for 18 to 24 hours. Following the retention period, the brine is passed through a filter 10, in which the precipitated calcium sulfate and sodium chloride are removed as a filter cake and discarded. The filtered strong brine is then heated, as in boil-down kettles 11 and a drier 12, to vaporize most of the remaining water, and thus to form solid magnesium chloride, drying usually being continued until the mono- or di-hydrate is formed.

The final crystalline product is substantially free of impurities and may be put directly to any of the ordinary uses of magnesium chloride. For instance, it is admirably suited as a raw material for certain commercial processes for the production of metallic magnesium by electrolysis of its fused chloride.

While the foregoing description presents a preferred mode of carrying out the new process, the details of the individual steps, particularly in the impurity removal procedure, may be varied somewhat without departing from the invention. For instance, while the addition of soluble sulfate solutions to the clarified magnesium chloride brine to remove calcium impurities as calcium sulfate has been described as taking place immediately prior to the evaporation step, it may also be accomplished subsequent to evaporation of the brine, or in part before and in part after evaporation. It is also possible to add the equivalent quantity of a soluble sulfate to the raw magnesium chloride brine immediately following the carbonation.

Still other modes of applying the principle of the invention may be employed instead of those explained, change being made as regards the details, provided the steps set forth in the following claims or the equivalent thereof, be employed.

We claim:

1. In a method of treating sea water to recover magnesium salts therefrom as substantially pure magnesium chloride, the steps which comprise: treating the sea water with lime in a proportion in excess of that required to convert the magnesium salts to magnesium hydroxide, the latter forming as a precipitate which also contains as impurities small proportions of calcium salts and sodium chloride; separating the precipitate from the treated sea water; creaming the precipitate with calcium chloride solution in a proportion in excess of that chemically equivalent to the magnesium hydroxide to produce a uniform suspension; introducing carbon dioxide into the suspension in a proportion sufficient to convert the magnesium hydroxide to magnesium chloride and simultaneously to form calcium carbonate as a precipitate, the resulting suspension also containing sodium chloride as impurity; separating the precipitated calcium carbonate from the carbonated suspension; adding a soluble sulfate to the resulting solution in a proportion such that the concentration of sulfate is approximately equivalent stoichiometrically to that of the calcium salts present therein thereby forming calcium sulfate, and evaporating the solution to a concentration at which the calcium sulfate and sodium chloride impurities are substantially insoluble therein; agitating the evaporated solution for a period sufficient to permit the calcium sulfate and sodium chloride impurities to precipitate substantially completely; removing the precipitated impurities by filtration; and evaporating the filtered solution to recover magnesium chloride therefrom in solid form.

2. In a method of treating sea water to recover magnesium salts therefrom as substantially pure magnesium chloride, the steps which comprise: treating the sea water with milk of lime in a proportion sufficient to react with all the magnesium salts in the sea water and to produce in the treated water an alkalinity between about 0.01 N and about .045 N, thereby forming a precipitate consisting essentially of magnesium hydroxide but also containing small proportions of calcium salts and sodium chloride as impurities; separating the magnesium hydroxide precipitate from the treated sea water; creaming the precipitate with calcium chloride brine in a proportion in excess of that chemically equivalent to the magnesium hydroxide to form a uniform suspension; bubbling carbon dioxide through the suspension for a time sufficient to convert the magnesium hydroxide to magnesium chloride and simultaneously to precipitate calcium carbonate, the resulting suspension also containing sodium chloride as impurity; separating the precipitated carbonate from the carbonated suspension; adding a solution of one of the compounds sodium sulfate and magnesium sulfate to the clarified solution in a proportion such that the concentration of sulfate is approximately equivalent stoichiometrically to the calcium salts present therein, thereby forming calcium sulfate, and evaporating the solution to a concentration between about 30 and about 40 per cent by weight of magnesium chloride, at which concentration the calcium sulfate and sodium chloride impurities are substantially insoluble therein; agitating the evaporated solution for a period sufficient to permit the calcium sulfate and sodium chloride impurities to precipitate substantially completely; removing the precipitated impurities by filtration; and evaporating the filtered solution to recover the magnesium chloride therefrom in solid form.

3. In a process wherein magnesium hydroxide is treated to recover the magnesium content thereof as magnesium chloride, the steps which comprise: mixing the magnesium hydroxide with calcium chloride solution in a proportion in excess of that chemicaly equivalent to the magnesium hydroxide; treating the resulting suspension with carbon dioxide to convert the magnesium hydroxide to magnesium chloride and simultaneously to form calcium carbonate as a precipitate; separating the precipitated calcium carbonate from the carbonated suspension; adding a soluble sulfate to the clarified solution in a proportion such that the concentration of sulfate is approximately equivalent stoichiometrically to the calcium salts present therein, thereby forming calcium sulfate, and evaporating the solution to a concentration at which the calcium sulfate impurities are substantially insoluble therein; removing such impurities from the evaporated solution; and further evaporating the purified solution to recover the magnesium chloride therefrom in solid form.

SHELDON B. HEATH.
FOREST R. MINGER.